United States Patent [19]
Glorioso

[11] Patent Number: 5,337,496
[45] Date of Patent: Aug. 16, 1994

[54] SLUDGE TREATMENT PROCESS

[75] Inventor: John D. Glorioso, Clearwater, Fla.

[73] Assignee: Enviro-Gro Technologies, Baltimore, Md.

[21] Appl. No.: 883,792

[22] Filed: May 14, 1992

Related U.S. Application Data

[60] Continuation of Ser. No. 549,029, Jul. 6, 1990, abandoned, which is a continuation of Ser. No. 353,711, May 18, 1989, Pat. No. 4,956,926, which is a division of Ser. No. 232,640, Aug. 18, 1988, Pat. No. 4,829,678, which is a continuation of Ser. No. 924,630, Oct. 20, 1986, Pat. No. 4,761,893.

[51] Int. Cl.$^5$ ............................................. F26B 7/00
[52] U.S. Cl. ........................................ 34/378; 34/136; 34/379; 34/387; 34/500
[58] Field of Search ................. 432/105, 103, 106, 108

[56] References Cited

U.S. PATENT DOCUMENTS

| | | |
|---|---|---|
| 2,023,247 | 12/1935 | Senseman . |
| 2,148,447 | 2/1939 | Dundas et al. . |
| 2,152,367 | 3/1939 | Smith . |
| 2,157,775 | 5/1939 | Smith . |
| 2,350,162 | 5/1944 | Gordon . |
| 3,785,063 | 1/1974 | Bishop ................................. 34/136 |
| 4,177,575 | 12/1979 | Brooks ................................. 34/136 |
| 4,558,525 | 12/1985 | Duske et al. ...................... 34/136 X |
| 4,829,678 | 5/1989 | Glorioso ............................... 34/11 |

OTHER PUBLICATIONS

Jan. 17, 1990, discovery deposition of Richard E. Birner (transcript and deposition exhibits), (Appendix A attached).

"The C-E Raymond Flash Drying and Incineration System for Sewage Sludge Disposal", by Combustion Engineering, Inc., Copyright 1957.

Primary Examiner—Henry A. Bennet
Attorney, Agent, or Firm—Lowe, Price, LeBlanc & Becker

[57] ABSTRACT

A system is described for producing small uniform pellets of predetermined size which are substantially free of fines from mechanically dewatered sewage sludge. The system includes a process and apparatus for mixing the dewatered sludge with previously dried, recycled particles of said sludge, drying said mixture in a thermal drier, separating a substantial portion of the dried solids from the drier off gas, clarifying said separated solids to separate the pellets of predetermined size, oversize pellets, and undersize pellets and particles, mechanically crushing the oversize pellets and admixing the crushed oversize pellets with the undersize pellets and particles, and recycling said mixture by mixing said mixture with incoming dewatered sludge to the drier.

19 Claims, 2 Drawing Sheets

SLUDGE TREATMENT PROCESS

This application is a continuation of application Ser. No. 07/549,029 filed Jul. 6, 1990, now abandoned which is a continuation of application Ser. No. 353,711, filed May 18, 1989, now U.S. Pat. No. 4,956,926, which is a divisional of application Ser. No. 232,640, filed Aug. 8, 1988, now U.S. Pat. No. 4,829,678, which was a continuation of application Ser. No. 924,630, filed Oct. 20, 1986, now U.S. Pat. No. 4,761,893.

This invention relates to an improved system for disposing of sewage sludge, and in particular to a system for efficiently drying and pelletizing said sludge for sale as a plant nutrient, soil conditioner, or bulking agent for fertilizer production. The pellets formed are substantially uniform in size and dimensioned to be used in conventional spreaders.

Waste liquid sludge from a sewage treatment plant may contain over 90% water. Conventional disposal techniques include dewatering, drying and disposal in, for example, a land fill. This means of disposal, however, is increasingly becoming not feasible due to environmental regulations and transportation costs.

An alternative, because the sludge contains, when dry, combustible materials, is burning the sludge to produce heat. Normally in such procedures, the sludge is dried in a drier and then burned in a furnace wherein the off gas is passed through a heat exchanger. See, for example, U.S. Pat. No. 4,429,643. In the sludge treated in processes such as that described in the above patent, the wet sludge cake has a moisture content of about 80% as it enters the drier. The moisture is flashed away in the drier and the dried product is pelletized. The off gas from the drier is then mixed with outside air and used as combustion gas in the furnace.

Producing pellets of uniform size has presented a problem in the past. Uniform size pellets are important whether the sludge is to be burned or used as a soil conditioner. In the latter case, uniform size pellets are very important so that the pellets may be used in conventional spreading equipment.

In U.S. Pat. No. 3,963,471 to Quintan L. Hampton, a process is described for producing uniform pellets wherein the wet sludge cake from a mechanical dewatering procedure is mixed with previously dried product pellets and the mixture is then cycled through the drier. It is described that the size of the pellets can be controlled by the amount of material recycled. The recycled pellets then form nucleii for the formation of pellets in the drier as they are surrounded by an adhering layer of wet sludge cake.

In U.S. Pat. No. 4,040,190 there is described a process wherein the recycled materials are all passed through a crusher before being mixed with a wet sludge cake. In that patent it is indicated that the crushing device may be adjusted for controlling the size of the grains to be supplied to the device and that by crushing to a predetermined size the grain size of the output pellets can be controlled. However, this neglects the presence of fines in the recycled product. The entire output from the drier is crushed and then a portion diverted to be recycled with the remaining to storage. Therefore, the product would include fines both from the cyclone separator used for the off gas from the drier, and from the crushing of oversized particles wherein said particles fracture.

It has been discovered, however, that the output particle size can be regulated within desired limits to substantially eliminate fines from the product. According to the system of this invention, the output from the drier is initially separated from the fines and routed to a rotary screen. The rotary screen then separates the oversized pellets from the regular sized pellets, and the latter from the fines. The airstream containing fines then passes through a cyclone system for removing the fines, and fines from the cyclone system and from the rotary screen are combined in a recycle bin. The product size pellets are then routed to a product bin for sale as a fertilizer, soil conditioner, or the like. Finally, the oversized pellets are crushed and routed to the recycle bin. In this way, product size pellets which may be preferably 4 to 5 millimeters in diameter can be provided for sale, use as a fuel or the like substantially without fines. The system also provides for a deodorizing treatment of the airstream from the cyclone separator before emission into the atmosphere. This treatment may include a wet scrubber, a chemical tower, and the like. Any liquid from this treatment is routed back to the head of the plant and added to incoming liquid sludge.

The drier may be heated with conventional means such as oil, natural gas or a wood burner or other suitable fuel may be used to supplement fossil fuel. If desired, the dried sludge may be used as a source of fuel.

Accordingly, it is an object of this invention to provide a system for pelletizing sewage sludge to produce pellets of uniform size useful as a soil conditioner, fertilizer, fuel or the like.

It is another object of this invention to provide a system wherein dewatered wet sludge cake is combined with recycled dried sludge pellets and pelletized in a rotary drier, with the output from said drier being screened to separate product size pellets from oversized pellets which are crushed and from fines whereby the crushed oversize pellets and fines are recycled to be admixed with the dewatered sludge cake.

It is yet another object of this invention to provide a system wherein the output dried sludge pellets exiting a drier are initially subjected to a lower velocity centrifugal separation from the airstream and then screened to separate oversized, product sized, and fines. Oversized pellets are then crushed and admixed with the fines for recycling as input to the drier with dewatered sludge cake. These and other objects will become readily apparent with reference to the drawings and following description wherein.

Figure 1:
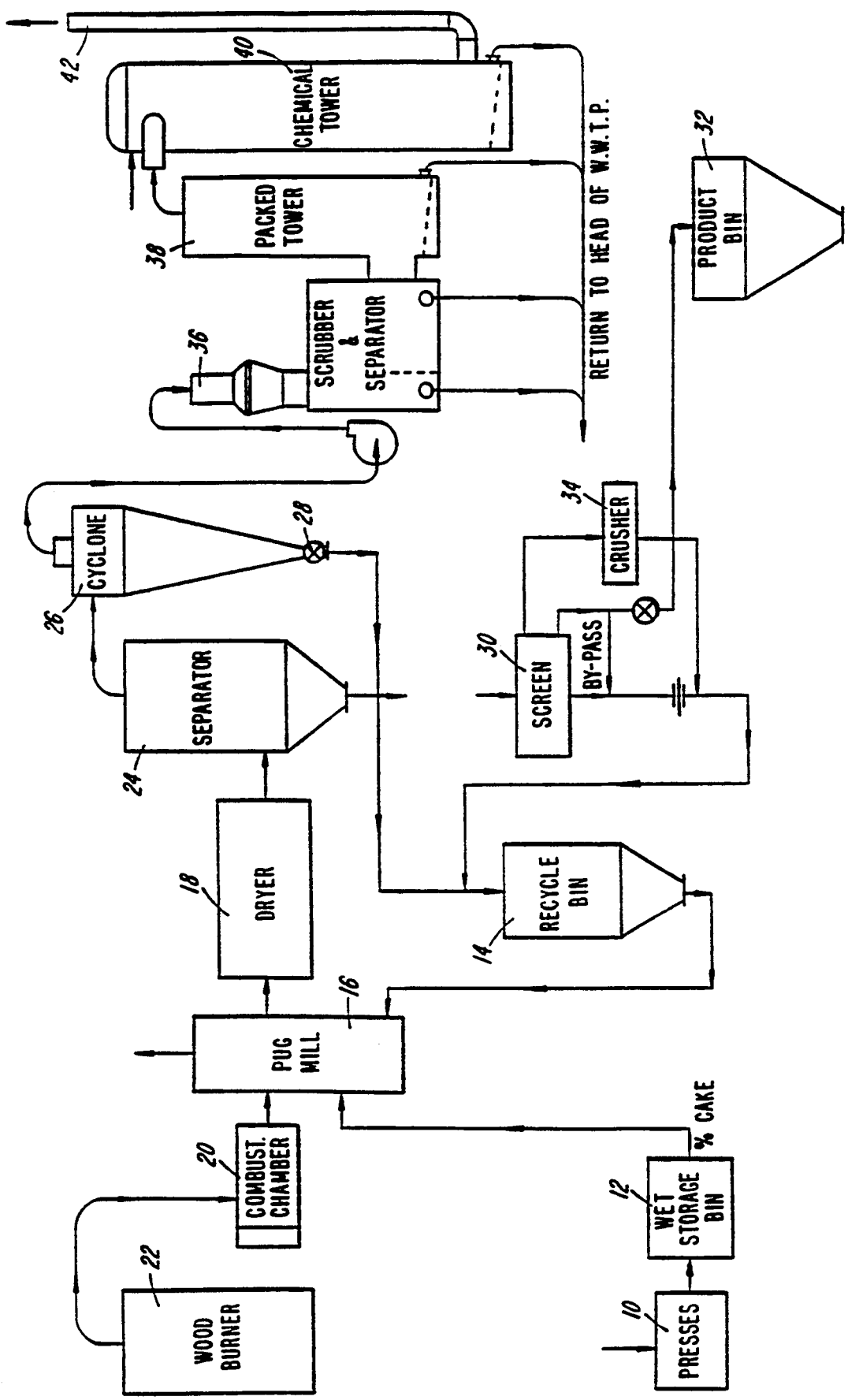
FIG. 1 is a schematic of the system of this invention.

With attention to the drawings and to FIG. 1 in particular, liquid sewage sludge may contain up to 90 to 99% water. According to conventional techniques, the sludge is subjected to flocculation whereby the sludge particles agglomerate so that when the liquid sewage sludge enters a mechanical press 10 it can be dewatered down to about 80% water and then routed to a storage bin 12. The material from bin 12 will be identified hereinafter as wet sludge cake. As noted, this material contains about 80% water.

Wet sludge cake from the storage bin 12 and recycled dried sludge from the recycle bin 14 are then routed by conventional conveyor to a mixing pug mill 16. In one embodiment of this invention two pug mills are used with a 90° turn. It should be noted that while the material from the recycle bin and the wet sludge cake can individually be conveyed by auger or the like, the mixture in the pug mill cannot. Accordingly, as soon as the product is mixed in the pug mill 16, it enters the drier 18 wherein heat is supplied by a conventional furnace 20 or the like. In the embodiment shown, the heat from furnace 20 is supplemented by a solid fuel burner 22 which may burn wood chips or the like. In the alternative, burner 22 could be fueled with sludge pellets and/or the combustion chamber 20 could be fueled with sludge pellets.

Drier 18 is preferably a triple pass rotary drier heated at the entrance to around 800° F. The mixture is intended to travel the length of the drier, make a 180° turn and travel the length two more times before exiting the drier. While several different types of rotary driers could be utilized, it is preferable to use the rotary drier described in U.S. Pat. No. 4,558,525.

Pelletized sludge, together with the drier off gases, exit the drier 18 and enter a separator can 24. The temperature of this stream is about 180° F.

The separator can 24 is a vertically disposed cyclone-type separator that uses gravity and centrifugal force to remove about 85 to 90% of the solids from the gas stream. The gas stream then exits the separator into a cyclone 26 where the fines are removed and the fines then exit cyclone 26 at exit port 28 and are added to the recycle bin 14.

Cyclone 26 could be a conventional cyclone system, but it is preferred to use the separator described in U.S. Pat. No. 4,357,152 for more efficient removal of the solids from the gas stream. Solids from separator 24 then enter screen system 30. Preferably, screen system 30 is a rotary screen which also acts as a cooler. In the preferred embodiment of this invention, ⅛ inch and 3/32 screens are provided. Material larger in diameter than 3/32 inch is classified as oversize. Particles in diameter between ⅛ inch and 3/32 inch are the product and are routed to a product bin 32. The oversize particles are then routed to a conventional crusher 34 which may be a roller or the like. The crushed particles are then routed to the recycle bin 14. The fines passing through the ⅛ inch screen then exit the screen and are also routed to the recycle bin. As shown in FIG. 1, in the event of a need for more recycle material, product may bypass the product bin and be routed to the recycle bin.

Finally, the airstream exhausted from cyclone 26 passes preferably through a scrubber 36, a packed tower 38, and a chemical tower 40 before being exhausted to the atmosphere through stack 42. This procedure will eliminate any solids remaining beyond that permitted by air pollution regulations as well as any noxious odors. The liquid from the air treatment system 36, 38, 40 and 42 is then returned to the head of the waste water treatment plant to be combined with the liquid sludge being admitted to press 10 for recycling.

During normal operation the product pellets have an optimum size of about 4 to 5 millimeters and constitute about 10% of the solids passing through the system.

As previously indicated, the entrance temperature at the rotary drier is about 800° F. The temperature of the airstream exiting the drier is about 180° F. After cooling in the rotary cooler screen system 30, the recycle materials in the recycle bin are at a temperature of about 140° F.

Figure 2:
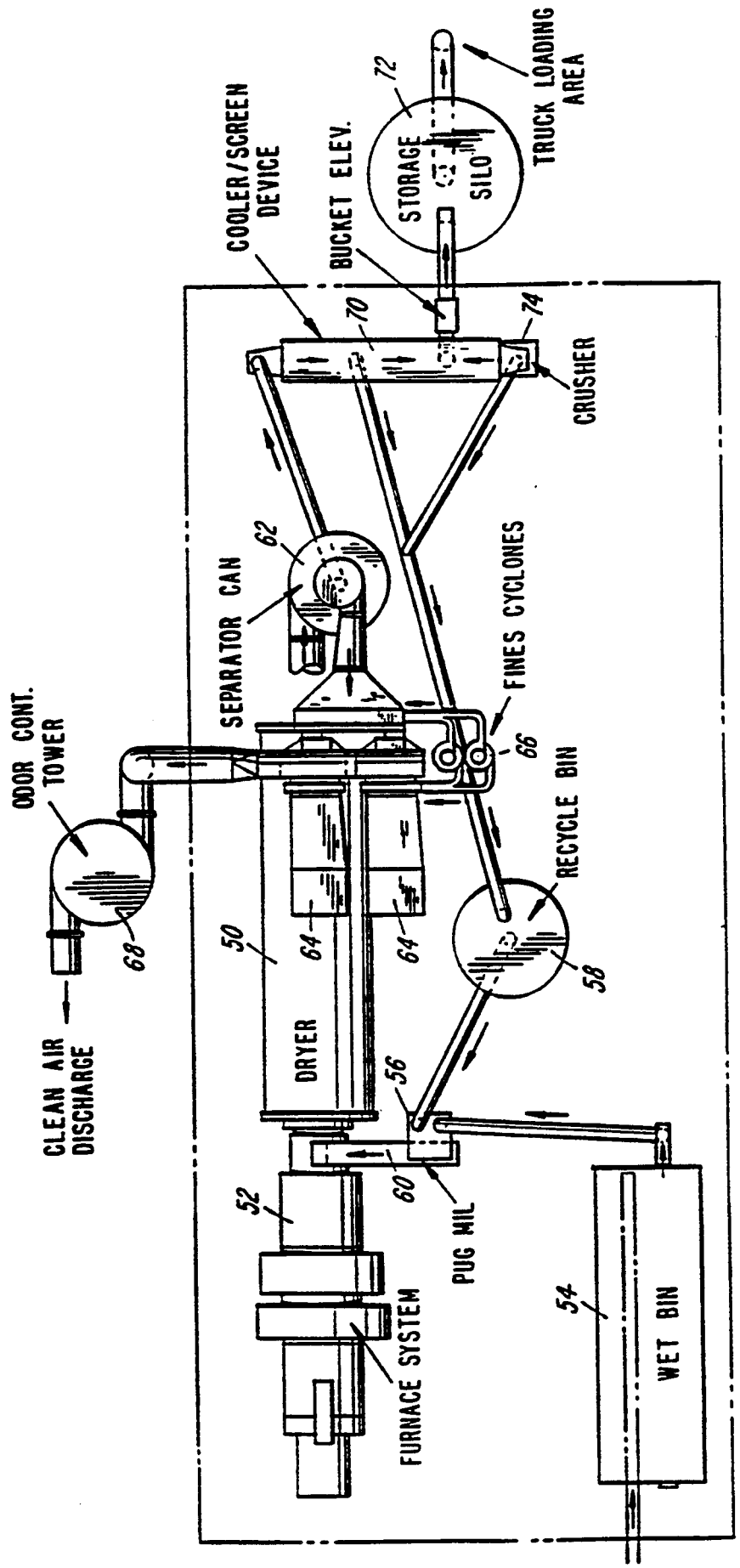
FIG. 2 is a schematic of a preferred version of the system of this invention.

With attention to FIG. 2, FIG. 2 represents a slight modification of the system of FIG. 1. The source of heat for drier 50 is a conventional furnace system 52 which utilizes a conventional fuel such as oil. Wet sludge cake from a storage bin 54 is routed to a first pug mill 56 where the wet cake is mixed with dried pellets from the recycle bin 58. The mixture from mill 56 then drops into a second pug mill 60 and makes a 90° turn as shown to promote mixing.

The mixture then enters drier 50 in front of the outlet from furnace 52. Drier 50 is preferably a triple pass drier as described above and shown in U.S. Pat. No. 4,558,525. After passing through the drier the stream including solids enters separator can 62. As described above, separator can 62 is a low velocity cyclone type separator. A commercial version may be obtained from Progressive Development Incorporated of Milwaukee, Wis. The air and fines from separator can 62 then enter either a pair of a single cyclone type separator 64 which are preferably the devices described and claimed in U.S. Pat. No. 4,357,152. The fines from the cyclone 64 are routed from additional cyclone separator(s) 66 to the recycle bin and the airstream returned to cyclone 64. The airstream exiting cyclone 64 then is treated in an odor controlling tower 68, which may be of conventional design, before the air is exhausted to the atmosphere.

The solids from separator can 62 then are routed to a cooler screening device 70. Preferably as described there are two screens in the cooler separator device. The first screen in this version separates out particles less than ⅛ inch in diameter and these particles are routed directly to the recycle bin 58 as shown. The second screen separates the product which has preferably a diameter of between ⅛ inch and 3/32 inch and that product is routed to storage 72 for eventual sale.

The oversize particles remaining then enter crusher 74 and are eventually rerouted to the recycle bin 58 for recycling through pug mills 56 and 60 to drier 50, with wet sludge cake.

In summary, the system of this invention provides a means for eliminating fines and undersized material from a product so that dried pelletized sewage sludge may be marketed in truly uniform pellet sizes. In addition, by crushing only the oversized particles, and by recycling the crushed material, the size of the product formed can be strictly regulated. The system of this invention also obviates the need for passing fines and product size pellets through a crusher wherein even the product size pellets could be crushed against each other. The system of this invention combines a low velocity separator which removes up to about 85–90% of the solids exiting the drier and a screen device for solids separation so that the smaller particles and oversized particles after crushing can be recycled.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A process for drying mechanically dewatered sewage sludge to produce pellets of a predetermined small and uniform size comprising the steps of:
   mixing said sludge with recycled, previously dried sludge particles and pellets;
   providing a thermal drier heated by a stream of hot combustion gases passing therethrough;
   flash drying said mixture in said thermal drier to form in said drier pellets and particles thereof by initially subjecting said mixture to a stream of hot combustion gases and subsequently by passing said mixture through said drier concurrently with said hot gas stream;

conveying the dried pellets and particles and drier off gas from said drier to a low velocity gas/solids separator and separating and collecting the pellets and a substantial portion of the particles;

clarifying the collected pellets and particles, and separating and collecting the pellets of a predetermined size, the undersize pellets and particles, and the oversize pellets;

mechanically crushing the oversize pellets and collecting the crushed pellets and undersize pellets and particles; and recycling the collected undersize pellets and particles and crushed pellets by mixing said recycled materials with said incoming sludge to the drier.

2. The process of claim 1 further comprising collecting the off gas from the gas/solids separator, removing substantially all of any fines entrained therein and recycling said fines with the crushed pellets and undersize pellets and particles.

3. The process of claim 1 wherein the thermal drier is a triple pass rotary drier.

4. The process of claim 3 wherein the entrance temperature at said drier is about 800° F.

5. The process of claim 1 wherein the step of clarifying further comprises cooling said collected pellets and particles.

6. The process of claim 1 further comprising admixing said crushed oversize pellets, undersize pellets and particles, and fines for recycling with said mechanically dewatered sewage sludge.

7. The process of claim 1, wherein the step of separating further comprises separating about 85 to 90% of the solids in said separator exiting said drier.

8. An apparatus for drying mechanically dewatered sewage sludge to produce pellets of a predetermined small and uniform size comprising:

means for mixing said sludge with recycled, previously dried sludge particles and pellets;

thermal drying means heated by a stream of hot combustion gases passing therethrough downstream of said mixing means for receiving said mixture and flash drying said mixture by subjecting it to an initial stream of hot combustion gases and by passing it therethrough concurrently with the hot gas stream to form in said drying means the dried pellets and particles thereof entrained in the gas stream;

gas/solids separator means downstream of said drying means for receiving from said drying means the dried pellets and particles and off gas and for separating a substantial portion of said particles and pellets therefrom;

clarifying means downstream of said separator for receiving said separated particles and pellets and separating the pellets of a predetermined size, the undersize pellets and particles, and the oversize pellets;

mechanical crushing means downstream of said clarifying means for receiving and mechanically crushing the oversize pellets; and storage bin means and conveying means for conveying the crushed oversize pellets and undersize pellets and particles from the clarifying means into the storage bin means whereby the contents of said storage bin means may be recycled by mixing the same with incoming dewatered sludge to be admitted to said drying means.

9. The apparatus of claim 8 further comprising cyclone means coupled to said gas/solids separator means for receiving the off gas therefrom and for separating substantially all remaining solids therefrom and conveying means for conveying said separated solids to said storage bin means for recycling.

10. The apparatus of claim 8 wherein said thermal drying means includes a rotary triple pass drier.

11. The apparatus of claim 8 wherein said clarifying means further comprises means for separating pellets between ⅛ and inch and 3/32 in diameter, means for separating pellets and particles having diameters of less than ⅛ inch and means for separating oversize pellets having diameters of greater than 3/32 inch.

12. The apparatus of claim 8 wherein said clarifying means further includes cooling means for cooling said collected pellets and particles.

13. The apparatus of claim 8 wherein said thermal drying means provides an inlet temperature of about 800° F.

14. The apparatus of claim 8 wherein said clarifying means is adapted to separate and collect pellets of a diameter of about 4–5 millimeter.

15. A process for drying mechanically dewatered sewage sludge to produce pellets of a predetermined small and uniform size comprising the steps of:

mixing said sludge with recycled, previously dried sludge particles and pellets;

flash drying said mixture in a thermal drier by initially subjecting it to a stream of hot combustion gas and passing said mixture concurrently therethrough to form in said drier pellets and particles thereof;

conveying the dried pellets and particles and drier off gas from said drier to a cyclone gas/solids separator and separating and collecting the pellets and a substantial portion of the particles;

clarifying the collected pellets and particles, and separating and collecting the pellets of a predetermined size, the undersize pellets and particles, and the oversize pellets;

collecting the oversize pellets and undersize pellets and particles; and recycling the collected undersize pellets and particles and oversize pellets by mixing said recycled materials with said incoming sludge to the drier.

16. The process of claim 15 further comprising collecting the off gas from the gas/solids separator, removing substantially all of any fines entrained therein and recycling said fines with the oversize pellets and undersize pellets and particles.

17. An apparatus for drying mechanically dewatered sewage sludge to produce pellets of a predetermined small and uniform size comprising:

means for mixing said sludge with recycled, previously dried sludge particles and pellets;

thermal flash drying means heated by a stream of hot combustion gases passing therethrough downstream of said mixing means for receiving said mixture and flash drying said mixture in an initial stream of hot combustion gases and subsequently in a concurrent flow of said gases therethrough to form in said drying means the dried pellets and particles thereof entrained in the gas stream;

gas/solids separator means downstream of said drying means for receiving from said drying means the dried pellets and particles and off gas and for separating a substantial portion of said particles and pellets therein;

clarifying means downstream of said separator for receiving said separated particles and pellets and separating the pellets of a predetermined size, the undersize pellets and particles, and the oversize pellets;

storage bin means and conveying means for conveying the oversize pellets and undersize pellets and particles from the clarifying means into the storage bin means whereby the contents of said storage bin means may be recycled by mixing the same with incoming dewatered sludge to be admitted to said drying means.

18. The apparatus of claim 17 further comprising cyclone means coupled to said gas/solids separator means for receiving the off gas therefrom and for separating substantially all remaining solids therefrom and conveying means for conveying said separated solids to said storage bin means for recycling.

19. The apparatus of claim 17 wherein said clarifying means further comprises means for separating pellets between ⅛ inch and 3/32 in diameter, means for separating pellets and particles having diameters of less than ⅛ inch and means for separating oversize pellets having diameters of greater than 3/32 inch.

* * * * *